United States Patent [19]

Yamasaki

[11] Patent Number: 4,914,336

[45] Date of Patent: Apr. 3, 1990

[54] WAVE MOTOR DRIVING CIRCUIT

[75] Inventor: Masaharu Yamasaki, Tokyo, Japan

[73] Assignee: Seiko Instruments Inc., Japan

[21] Appl. No.: 218,698

[22] Filed: Jul. 13, 1988

[51] Int. Cl.[4] .............................................. H01L 41/68
[52] U.S. Cl. ..................................... 310/316; 310/323
[58] Field of Search ............... 310/316, 317, 323, 328; 318/116

[56]  References Cited
U.S. PATENT DOCUMENTS 4,727,276  2/1988  Izukawa .............................. 310/316

Primary Examiner—Mark O. Budd
Attorney, Agent, or Firm—Bruce L. Adams; Van C. Wilks

[57] ABSTRACT

A wave motor driving circuit for driving a moving body frictionally by vibrations generated by applying electric signals to electromechanical transducer stuck on an elastic body, the wave motor driving circuit comprises: a driving-wave forming circuit for forming driving waveforms to drive to wave motor; a position sensor for detecting rotational position of the moving body of the wave motor; a position detector circuit for outputting position information from the position sensor in accordance with a request signal from a detection control circuit; and the detection control circuit for generating the request signal having means for altering an interval of generating the request signal in response to position information of the position detector circuit.

15 Claims, 3 Drawing Sheets 4,914,336

WAVE MOTOR DRIVING CIRCUIT

BACKGROUND OF THE INVENTION

1. Field of the Invention

This invention relates to a wave motor using ultrasonic oscillation to drive a moving body, and more particularly to a travelling-wave motor which drives a moving body frictionally by travelling-wave generated by a applying electric signals to an electromechanical transducer adhered to an elastic body.

2. Description of the Prior Art

Two types of the ultrasonic motor are conventionally known. One is a standing-wave type motor which employs a Langevin oscillator as a driving source. Such a type of motor is disclosed in U.S. Pat. No. 4,019,073. The other is a travelling-wave type motor employing a travelling wave generated on a stator for driving a rotor provided on the stator. The travelling-wave motor generates smaller wear in the friction-transmition surface between the stator and the rotor, and is easier to drive in the reverse-rotation direction in comparison with the standing-wave type motor. Such a travelling-wave motor is disclosed in U.S. Pat. No. 4,513,219 to Katsuma et al., U.S. Pat. No. 4,562,374 to Sashida and European Pat. Appl. Pub. No. 169297 of Tokushima. Katsuma et al. and Sashida disclose travelling-wave motors employing a ring type of a piezoelectric member. This type of travelling-wave motor essentially consists of an annular vibrating body and a movable body provided thereon. The vibrating body has an annular piezoelectric vibrator thereon.

Another type of travelling-wave motor employing a disk-shaped piezoelectric member is disclosed in the European Patent Application of Tokushima. In such a motor, a stator is a disk-shaped elastic vibrating body having a toothlike circular protrusion. The vibrating body has a disk-shaped piezoelectric vibrator thereon. A movable body is provided on the protrusion of the vibrating body and has a central shaft for rotational guide. A pressure-regulating mechanism is provided on the central shaft for making a suitable contact pressure between the vibrating body and the movable body to efficiently conduct the travelling wave component to the movable body.

Since the travelling-wave motors employ friction between the vibrating body and movable body to drive the movable body, the rotating velocity changes according to the condition of the frictionally engaged surfaces. Moreover, the rotating velocity also changes depending on a voltage applied to the piezoelctric element. Travelling-wave motors employing mechanisms for controlling the rotating velocity and rotational position of the movable body are disclosed in Japanese Laid Open Patent Nos. sho 60-51478 and sho 60-113675. The travelling-wave motor disclosed in the Laid Open Patent No. sho 60-51478 employs a divided metal pattern formed on the upper surface of the movable body and a rotation detecting leaf spring pushing the upper surface of the movable body in order to derive rotational position information as electric signals. While the travelling-wave motor disclosed in the Laid Open Patent No. sho 60-113675 employs a photo diode, a through hole provided in a disk-shape movable body and a photo transistor in order to derive rotational position information as electric signals. Both conventional travelling motors described above conduct detection of position every time in accordance with a drive of the wave motor. Therefore, the travelling-wave motors described above have a shortcoming that much energy is consumed for detection of the position of the movable body.

SUMMARY OF THE INVENTION

It is therefore an object of the present invention to provide a wave motor driving circuit which is energy-saving and has little position slippage.

It is another object of the invention to provide a wave motor in which an interval of operation of the position detector circuit is controlled in accordance with the state of operation of the wave motor.

These and other object of the present invention are accomplished by providing a wave motor driving circuit which includes a driving-wave forming a circuit for forming driving wave the drive to wave motor; a position sensor for detecting the rotational position of the moving body of the wave motor; a position detector circuit for taking in the output of the position sensor by a request signal from a detection control circuit and outputting it; and a detection control circuit for generating the request signal and having a circuit for altering an interval of generating the request signal in response to the detection signal of the position detector circuit.

The wave motor driving circuit described above is so designed that the interval of operation of the position detector circuit is elongated when the result of detection by the position detector circuit is normal for a prescribed number of times, and is reduced when the result of detection is abnormal.

Thus, a wave motor driving circuit for driving a wave motor with little positional slippage and which is energy-saving in operation can be produced.

Further scope of applicability of the present invention will become apparent from the detailed description presented hereinafter. It should be understood, however, that the detailed description and the specific examples, while representing a preferred embodiment of the invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiments present hereinbelow, and the accompanying drawings, which are given by way of illustration only and are not intended to be limitative of the present invention, and wherein.

DETAIL DESCRIPTION OF THE PREFERRED EMBODIMENT

Figure 1:
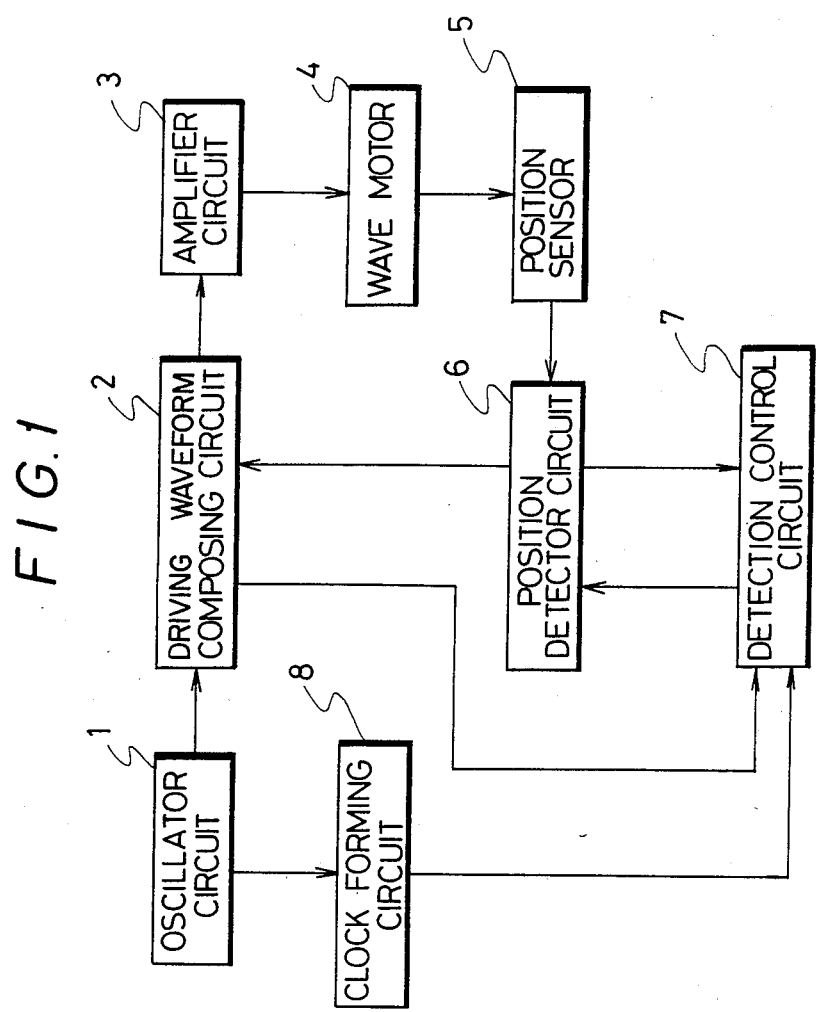
FIG. 1 illustrates a block diagram of a wave motor driving circuit according to the present invention.

FIG. 1 is a block diagram of a wave motor driving circuit according to the present invention.

The circuit includes an oscillator circuit 1, a driving waveform composing circuit 2 which composes a driving waveform of a wave motor by an output of the oscillator circuit 1, an amplifier circuit which amplifies an output of the driving wave composing circuit 2, a wave motor 4 driven by an output of the amplifier circuit 3 and which has a vibrating body, an electromechanical transducer in the form of a piezoelectric oscillator affixed to the vibrating member or body and a moving body or rotary member frictionally driven on the surface of the vibrating body, a sensor 5 for detecting a stop position of the vibrating body of the wave motor 4, a position detector circuit 6 which takes in an output of the sensor 5, as occasion calls, to control the position of the wave motor 4, a detection control circuit 7 which controls the position detector circuit 6 in accordance with outputs of the driving waveform composing circuit 2 and the position detector circuit 6, and a clock forming circuit 8 which forms a necessary clock out of the output of the oscillator circuit 1.

Figure 2:
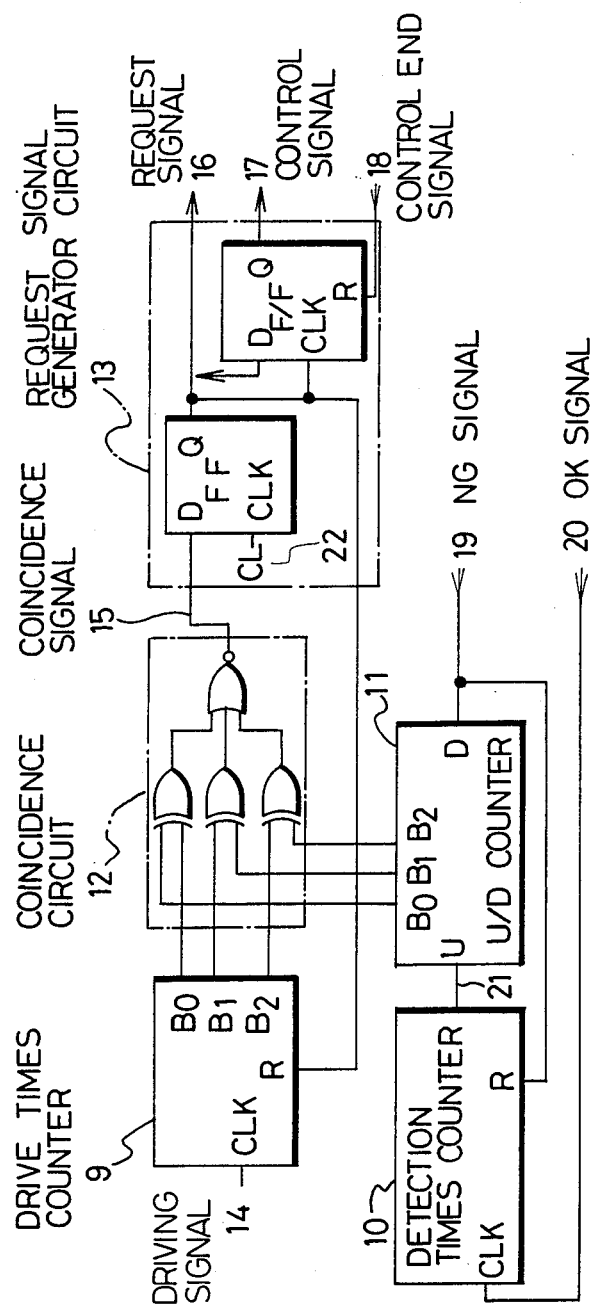
FIG. 2 illustrates a circuit diagram of a detection control circuit according to the present invention.

FIG. 2 is an embodiment of the detection control circuit 7 according to the present invention. This circuit includes a drive times counter 9 which counts a driving signal 14 outputted from the driving waveform composing circuit 2 every time the wave motor 4 operates and delivers a count value to a coincidence circuit 12, a detection times counter 10 which counts the number of times of an OK detection signal 20 outputted from the position detector circuit 6 when the position of the wave motor 4 after operation is normal and, an up/-down counter 11 (hereinafter referred to as U/D counter) which counts up according to an output of the detection times counter 10 while counting down according to an NG detection signal 19 outputted from the position detector circuit 6 when the position of the wave motor 4 after operation is abnormal, and delivers a count value to a coincidence circuit 12. The coincidence circuit 12 compares a count value of the drive times counter 9 with a count value of the U/D counter and outputs a coincidence signal 15 when the compared count values are equal. The coincidence signal 15 is fed to a request signal generator circuit 13 which intermittently outputs a request signal 16 and a control signal 17 to the position detector circuit 6 in response to the coincidence signal 15. The operation of the wave motor driving circuit of the present invention will be described hereunder by using FIG. 2.

Now, it is assumed that the U/D counter 11 holds a value of N. The drive times counter 9 counts the driving signal 14 outputted from the driving waveform composing circuit 2 every time the wave motor 4 is driven, and delivers a count value to the coincidence circuit 12. The coincidence circuit 12 delivers a coincidence signal 15 to the request signal generator circuit 13 when the value of the drive times counter 9 becomes N. The request signal generator circuit 13 first delivers the request signal 16 to the position detector circuit 6. The position detector circuit 6 detects the stop position of the wave motor 4 and delivers the OK detection signal 20 when the position is normal, and the NG detection signal 19 when the stop position is abnormal. The detection times counter 10 outputs an up signal 21 to the U/D counter when the OK signal 20 is counted up by a prescribed number of times. In response to the input of the up signal 21, the U/D counter 11 sets the output value at (N+1) and a subsequent request signal 16 is thereafter output once for (N+1) times of the driving signal 14, i.e. once for (N+1) times of drives of the wave motor 4. This is because the detection of one time for N times of drive of the wave motor 4 is judged to be ample enough from a point that the result of detection in the prescribed number of times shows normality. The delivery of the control signal 17 in this case aims to modify a minute slippage of the wave motor 4. Output of the control signal 17 is started in accordance with the output of the request signal 16 and is terminated in accordance with the input of a control end signal 18 is generated as a pulse signal by the position detector circuit 6 in accordance with rising of the position signal sent from the position sensor 5. Output of the driving wave from the driving waveform composing circuit 2 is continued until falling of the control signal 17.

In the case when the NG signal 19 is outputted from the position detector circuit 6, the U/D counter 11 sets the output value at (N−1) and a subsequent request signal 16 is thereafter output once for (N−1) times of drive of the wave motor 4. The NG signal 19 also resets the detection times counter 10. The request signal generator circuit 13 outputs the control signal 17 to the position detector circuit 6. In response to the control signal 17, the position detector circuit 6 detects the stop position of the first drive (the drive times counter 9 having already been reset) of the wave motor 4, and outputs the control end signal 18 to halt the control signal 17. In other words, the position of the wave motor 4 is modified by the control signal 17 when the request signal 16 shows abnormality as the result of detection. By repeating such processes as described above, the waver motor 4 can be driven at time spaced intervals of detection corresponding to the driving state of the wave motor 4.

Figure 3:
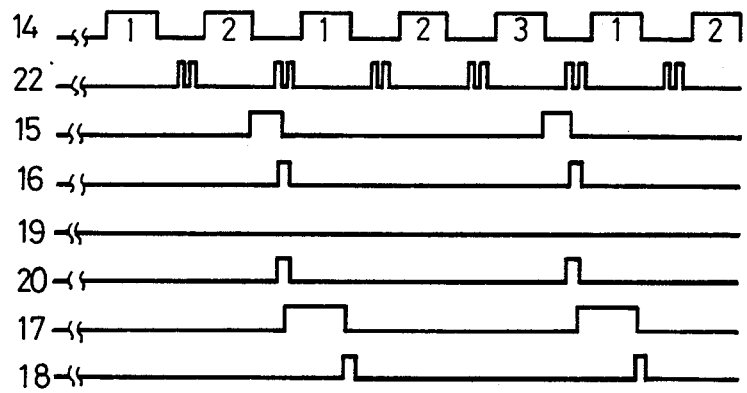
FIG. 3 illustrates a timing chart of the detection control circuit according to the present invention.
Figure 4:
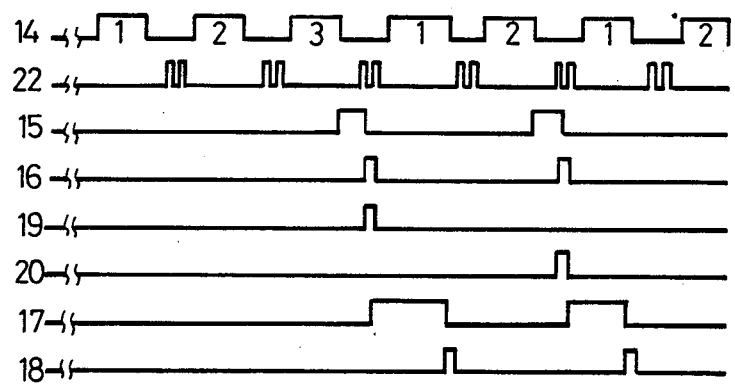
FIG. 4 illustrates another timing chart of the detection control circuit according to the present invention.

At timing chart of the detection control circuit according to the present invention is shown in FIGS. 3 and 4. FIG. 3 shows an example of a normal drive wherein detection at every two times reaches a prescribed number of times and shifts to the one of every three times, i.e., the detection interval is lengthened. FIG. 4 shows an example of the case when a shift is made from the detection of every three times to that of every two times owing to an abnormal drive, i.e., the detection interval is shortened.

According to the present invention, as described above, the interval of operation of the position detector circuit is altered (lengthened or shortened) in accordance with the state of drive of the wave motor, and therefore a wave motor driving circuit showing little positional slippage and being energy-saving in operation can be produced.

Although the present invention has been described in connection with particular embodiments thereof, additional embodiments, applications and modifications, which will be obvious to those skilled in the art, are included within the spirit and scope of the invention.

I claim:

1. A wave motor driving circuit for driving a wave motor having a movable body frictionally rotationally driven by vibrations generated by applying electric signals to an electromechanical transducer affixed to an elastic body, the wave motor driving circuit comprising:

driving-wave forming means for forming driving signals to drive a wave motor;

a position sensor for detecting a rotational position of the movable body of the wave motor;

position detector means responsive to a request signal for outputting a first signal representing that the movable body has stopped at a certain position defined by a given number of driving signals; and detection control means responsive to the first signals for generating intermittently the request signals, the detection control means having means for lengthening an interval between generation of the request signals in response to receipt of a predetermined number of the first signals.

2. A wave motor driving circuit as claimed in claim 1; wherein the position detector means includes means for controlling the driving-wave forming means.

3. A wave motor driving circuit as claimed in claim 2; wherein the controlling means has output means for outputting a control signal to terminate the output of the driving-wave forming means.

4. A wave motor driving circuit as claimed in claim 1; wherein the position detector means includes means responsive to the request signal for outputting a second signal representing that the movable body has not stopped at the certain position defined by said given number of driving signals.

5. A wave motor driving circuit as claimed in claim 4; wherein the detection control means includes means for shortening the interval between generation of the request signals in response to receipt of the second signal.

6. A wave motor driving circuit as claimed in claim 5; wherein the detection control means includes means for storing a number which is decremented by the input of the second signal, a drive times counter for counting the driving signals, and a coincidence circuit for comparing the number stored in the storing means with the content of the drive times counter.

7. A wave motor driving circuit as claimed in claim 1; wherein the detection control means includes a detection times counter for counting the inputted first signals and having output means for outputting a third signal when the detection times counter counts a predetermined number of signals, means for storing a number which is incremented by the input of the third signal, a drive times counter for counting the driving signals, and a coincidence circuit for comparing the number stored in the storing means with the content of the drive times counter.

8. A wave motor driving circuit as claimed in claim 1; wherein the position detector means includes means for applying the request signal to the position sensor to actuate the position sensor, and the position sensor includes detecting means for detecting in response to the request signal the rotational position of the movable body.

9. Circuitry for use with a wave motor having a rotary member rotationally frictionally driven by a travelling wave produced in a vibratory member in response to driving signals applied to an electromechanical transducer affixed to the vibratory member, the circuitry comprising: detecting means responsive to request signals for detecting in response to each request signal whether or not the rotary member has rotated a predetermined amount defined by a given number of applied driving signals and producing a corresponding detection signal indicative of whether or not the rotary member has rotated the predetermined amount; and control means responsive to the detection signals for producing request signals at time-spaced intervals which vary according to the detection signals and successively applying the request signals to the detecting means.

10. Circuitry according to claim 9; wherein the detecting means includes means for producing a first detection signal in response to detecting that the rotary member has rotated the predetermined amount; and the control means includes means for lengthening the interval between request signals in response to the first detection signal.

11. Circuitry according to claim 10; wherein the control means comprises first counting means for counting the first detection signals and producing a count signal after counting a predetermined number of first detection signals, storing means for storing a number and having means for incrementing the stored number in response to the count signal, second counting means for counting the number of applied driving signals and producing a corresponding count signal, and means for comparing the number stored in the storing means with the count content of the second counting means and producing a request signal when the compared numbers are the same, whereby the interval between request signals is lengthened.

12. Circuitry according to claim 10; wherein the detecting means includes means for producing a second detection signal in response to detecting that the rotary member has not rotated the predetermined amount; and the control means includes means for shortening the interval between request signals in response to the second detection signal.

13. Circuitry according to claim 11; wherein the control means comprises storing means for storing a number and having means for decrementing the stored number in response to the second detection signal, counting means for counting the number of applied driving signals and producing a corresponding count signal, and means for comparing the number stored in the storing means with the count content of the counting means and producing a request signal when the compared numbers are the same, whereby the interval between request signals is shortened.

14. Circuitry according to claim 9; wherein the control means includes means for lengthening the interval between successive request signals when the detection signal indicates that the rotary member has rotated the predetermined amount and shortening the interval between successive request signals when the detection signal indicates that the rotary member has not rotated the predetermined amount.

15. Circuitry according to claim 14; wherein the detecting means comprises a position sensor for detecting the rotational position of the rotary member and producing a corresponding output signal, and position detecting means responsive to the output signal and a request signal for detecting whether or not the rotary member has stopped at a certain stop position defined by the given number of applied driving pulses and producing a corresponding detection signal.

* * * * *